United States Patent
Kerfoot (10) Patent No.: US 9,694,401 B2
(45) Date of Patent: Jul. 4, 2017

(54) METHOD AND APPARATUS FOR TREATING PERFLUOROALKYL COMPOUNDS

(71) Applicant: ThinkVillage-Kerfoot, LLC, Boulder, CO (US)

(72) Inventor: William B. Kerfoot, Falmouth, MA (US)

(73) Assignee: KERFOOT TECHNOLOGIES, INC., Mashpee, MA (US)

(*) Notice: Subject to any disclaimer, the term of this patent is extended or adjusted under 35 U.S.C. 154(b) by 577 days.

(21) Appl. No.: 13/783,701

(22) Filed: Mar. 4, 2013

(65) Prior Publication Data
US 2014/0246366 A1    Sep. 4, 2014

(51) Int. Cl.
| | |
|---|---|
| *B09C 1/08* | (2006.01) |
| *C02F 1/02* | (2006.01) |
| *C02F 1/72* | (2006.01) |
| *C02F 1/78* | (2006.01) |
| *B09C 1/00* | (2006.01) |
| *C02F 103/06* | (2006.01) |

(52) U.S. Cl.
CPC .......... *B09C 1/08* (2013.01); *B09C 1/002* (2013.01); *C02F 1/02* (2013.01); *C02F 1/722* (2013.01); *C02F 1/78* (2013.01); *C02F 2103/06* (2013.01); *C02F 2305/023* (2013.01)

(58) Field of Classification Search
CPC . B09C 1/002; B09C 1/08; C02F 1/722; C02F 1/78; C02F 2103/06; C02F 1/20; C02F 2305/02; C02F 2305/023
See application file for complete search history.

(56) References Cited

U.S. PATENT DOCUMENTS

| | | | |
|---|---|---|---|
| 2,845,185 | A | 7/1958 | Winderweedle, Jr. |
| 2,946,446 | A | 7/1960 | Herbert |
| 3,027,009 | A | 3/1962 | Price |
| 3,206,178 | A | 9/1965 | Lamb |
| 3,219,520 | A | 11/1965 | Box |
| 3,276,994 | A | 10/1966 | Andrews |
| 3,441,216 | A | 4/1969 | Good |
| 3,545,731 | A | 12/1970 | McManus |
| 3,570,218 | A | 3/1971 | Finney |
| 3,669,276 | A | 6/1972 | Woods |
| 3,670,817 | A | 6/1972 | Saucier |
| 3,708,206 | A | 1/1973 | Hard et al. |
| 3,808,123 | A | 4/1974 | Neel |

(Continued)

OTHER PUBLICATIONS

International Search Report with Written Opinion corresponding to International Patent Application No. PCT/US14/20309, mailed Jun. 6, 2014.

(Continued)

*Primary Examiner* — Lucas Stelling
(74) *Attorney, Agent, or Firm* — Lathrop & Gage LLP (57) ABSTRACT

A method of treating a site containing perfluoroalkyl compounds (PFCs) is described. The method and apparatus treats the site with fine oxygen/ozone gas bubbles delivered with a hydroperoxide coating and solution which is activated by self-created temperature or applied temperature to raise the oxidation potential above 2.9 volts. Once begun, the reaction is often self-promulgating until the PFC is exhausted, if PFC concentrations are sufficiently elevated.

36 Claims, 8 Drawing Sheets

(56) References Cited

U.S. PATENT DOCUMENTS

| | | |
|---|---|---|
| 3,814,394 A | 6/1974 | Murray |
| 3,823,776 A | 7/1974 | Holmes |
| 3,997,447 A | 12/1976 | Breton et al. |
| 4,007,118 A | 2/1977 | Ciambrone |
| 4,021,347 A | 5/1977 | Teller et al. |
| 4,048,072 A | 9/1977 | McCullough |
| 4,049,552 A | 9/1977 | Arff |
| 4,064,163 A | 12/1977 | Drach et al. |
| 4,118,447 A | 10/1978 | Richter |
| 4,178,239 A | 12/1979 | Lowther |
| 4,203,837 A | 5/1980 | Hoge et al. |
| 4,268,283 A | 5/1981 | Roberts |
| 4,298,467 A | 11/1981 | Gartner et al. |
| 4,310,057 A | 1/1982 | Brame |
| 4,351,810 A | 9/1982 | Martinez et al. |
| 4,360,234 A | 11/1982 | Hsueh et al. |
| 4,614,596 A | 9/1986 | Wyness |
| 4,622,139 A | 11/1986 | Brown |
| 4,639,314 A | 1/1987 | Tyer |
| 4,684,479 A | 8/1987 | D'Arrigo |
| 4,695,447 A | 9/1987 | Shultz |
| 4,696,739 A | 9/1987 | Pedneault |
| 4,730,672 A | 3/1988 | Payne |
| 4,780,215 A | 10/1988 | Carlson |
| 4,832,122 A | 5/1989 | Corey et al. |
| 4,837,153 A | 6/1989 | Laurenson, Jr. |
| 4,838,434 A | 6/1989 | Miller et al. |
| 4,844,795 A | 7/1989 | Halwani |
| 4,849,114 A | 7/1989 | Zeff et al. |
| 4,883,589 A | 11/1989 | Konon |
| 4,941,957 A | 7/1990 | Zeff et al. |
| 4,943,305 A | 7/1990 | Bernhardt |
| 4,960,706 A | 10/1990 | Bliem et al. |
| 4,966,717 A | 10/1990 | Kern |
| 4,971,731 A | 11/1990 | Zipperian |
| 5,006,250 A | 4/1991 | Roberts |
| 5,025,113 A | 6/1991 | Sanderson et al. |
| 5,078,921 A | 1/1992 | Zipperian |
| 5,080,805 A | 1/1992 | Houser |
| 5,116,163 A | 5/1992 | Bernhardt |
| 5,120,442 A | 6/1992 | Kull et al. |
| 5,122,165 A | 6/1992 | Wang |
| 5,126,111 A | 6/1992 | Al-Ekabi et al. |
| 5,133,906 A | 7/1992 | Louis |
| 5,160,655 A | 11/1992 | Donker et al. |
| 5,167,806 A | 12/1992 | Wang et al. |
| 5,178,491 A | 1/1993 | Graves et al. |
| 5,178,755 A | 1/1993 | Lacrosse |
| 5,180,503 A | 1/1993 | Gorelick et al. |
| 5,205,927 A | 4/1993 | Wickramanayake |
| 5,215,680 A | 6/1993 | D'Arrigo |
| 5,221,159 A | 6/1993 | Billings et al. |
| 5,227,184 A | 7/1993 | Hurst |
| 5,238,437 A | 8/1993 | Vowles et al. |
| 5,246,309 A | 9/1993 | Hobby |
| 5,248,395 A | 9/1993 | Rastelli et al. |
| 5,254,253 A | 10/1993 | Behmann |
| 5,259,962 A | 11/1993 | Later |
| 5,269,943 A | 12/1993 | Wickramanayake |
| 5,277,518 A | 1/1994 | Billings et al. |
| 5,302,286 A | 4/1994 | Semprini et al. |
| 5,332,333 A | 7/1994 | Bentley |
| 5,348,664 A | 9/1994 | Kim et al. |
| RE34,890 E | 4/1995 | Sacre |
| 5,402,848 A | 4/1995 | Kelly |
| 5,403,476 A | 4/1995 | Bernhardt |
| 5,406,950 A | 4/1995 | Brandenburger et al. |
| 5,425,598 A | 6/1995 | Pennington |
| 5,427,693 A | 6/1995 | Mausgrover et al. |
| 5,430,228 A | 7/1995 | Ciambrone et al. |
| 5,431,286 A | 7/1995 | Xu et al. |
| 5,451,320 A | 9/1995 | Wang et al. |
| 5,464,309 A | 11/1995 | Mancini et al. |
| 5,472,294 A | 12/1995 | Billings et al. |
| 5,480,549 A | 1/1996 | Looney et al. |
| 5,482,630 A | 1/1996 | Lee et al. |
| 5,520,483 A | 5/1996 | Vigneri |
| 5,525,008 A | 6/1996 | Wilson |
| 5,545,330 A | 8/1996 | Ehrlich |
| 5,560,737 A | 10/1996 | Schuring et al. |
| 5,588,490 A | 12/1996 | Suthersan et al. |
| 5,609,798 A | 3/1997 | Liu et al. |
| 5,615,974 A | 4/1997 | Land et al. |
| 5,620,593 A | 4/1997 | Stagner |
| 5,622,450 A | 4/1997 | Grant et al. |
| 5,624,635 A | 4/1997 | Pryor |
| 5,663,475 A | 9/1997 | Elgal |
| 5,664,628 A | 9/1997 | Koehler et al. |
| 5,667,690 A | 9/1997 | Doddema et al. |
| 5,667,733 A | 9/1997 | Waldron, Sr. |
| 5,676,823 A | 10/1997 | McKay et al. |
| 5,698,092 A | 12/1997 | Chen |
| 5,741,427 A | 4/1998 | Watts et al. |
| 5,827,485 A | 10/1998 | Libal et al. |
| 5,833,388 A | 11/1998 | Edwards et al. |
| 5,851,407 A | 12/1998 | Bowman et al. |
| 5,855,775 A | 1/1999 | Kerfoot |
| 5,860,598 A | 1/1999 | Cruz |
| 5,879,108 A | 3/1999 | Haddad |
| 5,925,257 A | 7/1999 | Albelda et al. |
| 5,954,452 A | 9/1999 | Goldstein |
| 5,967,230 A | 10/1999 | Cooper et al. |
| 5,975,800 A | 11/1999 | Edwards et al. |
| 6,007,274 A | 12/1999 | Suthersan |
| 6,017,449 A | 1/2000 | Eriksson et al. |
| 6,083,403 A | 7/2000 | Tang et al. |
| 6,083,407 A | 7/2000 | Kerfoot |
| 6,086,769 A | 7/2000 | Kilambi et al. |
| 6,136,186 A | 10/2000 | Gonzalez-Martin et al. |
| 6,139,755 A | 10/2000 | Marte et al. |
| 6,149,819 A | 11/2000 | Martin et al. |
| 6,210,955 B1 | 4/2001 | Hayes |
| 6,214,240 B1 | 4/2001 | Yasunaga et al. |
| 6,217,767 B1 | 4/2001 | Clark |
| 6,221,002 B1 | 4/2001 | James |
| 6,254,310 B1 | 7/2001 | Suthersan |
| 6,283,674 B1 | 9/2001 | Suthersan |
| 6,284,143 B1 | 9/2001 | Kerfoot |
| 6,306,296 B1 | 10/2001 | Kerfoot |
| 6,312,605 B1 | 11/2001 | Kerfoot |
| 6,352,387 B1 | 3/2002 | Briggs et al. |
| 6,357,670 B2 | 3/2002 | Ganan-Calvo |
| 6,364,162 B1 | 4/2002 | Johnson |
| 6,391,259 B1 | 5/2002 | Malkin et al. |
| 6,403,034 B1 | 6/2002 | Nelson et al. |
| 6,428,694 B1 | 8/2002 | Brown |
| 6,436,285 B1 | 8/2002 | Kerfoot |
| 6,488,850 B2 | 12/2002 | Perriello |
| 6,533,499 B2 | 3/2003 | Breeding |
| 6,582,611 B1 | 6/2003 | Kerfoot |
| 6,596,161 B2 | 7/2003 | Kerfoot |
| 6,596,177 B2 | 7/2003 | Sherman |
| 6,623,211 B2 | 9/2003 | Kukor et al. |
| 6,645,450 B2 | 11/2003 | Stoltz et al. |
| 6,733,207 B2 | 5/2004 | Liebert, Jr. et al. |
| 6,736,379 B1 | 5/2004 | Wegner et al. |
| 6,745,815 B1 | 6/2004 | Senyard |
| 6,773,609 B1 | 8/2004 | Hashizume |
| 6,780,329 B2 | 8/2004 | Kerfoot |
| 6,787,038 B2 | 9/2004 | Brusseau et al. |
| 6,805,798 B2 | 10/2004 | Kerfoot |
| 6,818,136 B1 | 11/2004 | Marek |
| 6,827,861 B2 | 12/2004 | Kerfoot |
| 6,866,781 B2 | 3/2005 | Schindler |
| 6,872,318 B2 | 3/2005 | Kerfoot |
| 6,913,251 B2 | 7/2005 | Kerfoot |
| 6,921,477 B2 | 7/2005 | Wilhelm |
| 6,984,329 B2 | 1/2006 | Kerfoot |
| 7,022,241 B2 | 4/2006 | Kerfoot |
| 7,033,492 B2 | 4/2006 | Kerfoot |
| 7,131,638 B2 | 11/2006 | Kerfoot |
| 7,156,984 B2 | 1/2007 | Kerfoot |
| 7,208,090 B2 | 4/2007 | Applegate et al. |
| 7,213,642 B2 | 5/2007 | Kerfoot |

(56) References Cited

U.S. PATENT DOCUMENTS

| | | |
|---|---|---|
| 7,264,419 B2 | 9/2007 | Bowman et al. |
| 7,264,747 B2 | 9/2007 | Kerfoot |
| 7,300,039 B2 | 11/2007 | Kerfoot |
| 7,326,002 B2 | 2/2008 | Kerfoot |
| 7,401,767 B2 | 7/2008 | Kerfoot |
| 7,442,313 B2 | 10/2008 | Kerfoot |
| 7,451,965 B2 | 11/2008 | Kerfoot |
| 7,537,706 B2 | 5/2009 | Kerfoot |
| 7,547,388 B2 | 6/2009 | Kerfoot |
| 7,569,140 B2 | 8/2009 | Kerfoot |
| 7,572,368 B2 | 8/2009 | Kerfoot |
| 7,621,696 B2 | 11/2009 | Kerfoot |
| 7,645,384 B2 | 1/2010 | Kerfoot |
| 7,648,640 B2 | 1/2010 | Kerfoot |
| 7,651,611 B2 | 1/2010 | Kerfoot |
| 7,661,657 B2 | 2/2010 | Kerfoot |
| 7,666,313 B2 | 2/2010 | Kerfoot |
| 7,666,316 B2 | 2/2010 | Kerfoot |
| RE43,350 E | 5/2012 | Kerfoot |
| 8,302,939 B2 | 11/2012 | Kerfoot |
| 2002/0029493 A1 | 3/2002 | Baek |
| 2002/0109247 A1 | 8/2002 | Jager et al. |
| 2003/0222359 A1 | 12/2003 | Jager |
| 2004/0045911 A1* | 3/2004 | Kerfoot ............... B09C 1/08 210/759 |
| 2005/0067356 A1 | 3/2005 | Bowman et al. |
| 2006/0243668 A1 | 11/2006 | Miller et al. |
| 2008/0008535 A1* | 1/2008 | Ball ..................... B09C 1/08 405/128.5 |
| 2008/0061006 A1* | 3/2008 | Kerfoot ............... C02F 1/78 210/760 |
| 2009/0272697 A1 | 11/2009 | Kerfoot |
| 2009/0304449 A1 | 12/2009 | Kerfoot |
| 2010/0078372 A1* | 4/2010 | Kerfoot ............... B09C 1/08 210/150 |
| 2010/0116725 A1 | 5/2010 | Kerfoot |
| 2012/0085530 A1 | 4/2012 | Kerfoot |
| 2013/0200303 A1* | 8/2013 | Pancras ............... B09C 1/08 252/186.21 |

OTHER PUBLICATIONS

Ahmad et al. (2010) "Persulfate Activation by Subsurface Minerals," *J. Contam. Hydrol.* 115: 34-45.

Ahmad et al. (May 21-24, 2012) "Degradation of Perfluorooctanoic Acid (PFOA) by Reactive Species Generated Through Catalyzed Hydrogen Peroxide Propagation Reactions," In; The 8$^{th}$ International Conference on Remediation of Chlorinated and Recalcitrant Compounds, Battelle 2012 Conference, Monterey, California.

Environmental Protection Agency (2012) "Emerging Contaminants, Perfluorooctane Sulfonate (PFOS) and Perfluorooctanoic Acid (PFOA)," Solid Waste and Emergency Response (5106P), EPA 505-F-11-002.

Hawley et al. (2012) "Remediation Technologies for Perfluorinated Compounds (PFCs), Including Perfluorooctane Sulfonate (PFOS) and Perfluorooctanoic Acid (PFOA)," *Arcadis White Paper*.

Katsuna et al. (2007) *Int. J. Chem. Kin.* "Rate Constants for Aqueous-Phase Reactions of $SO_4^-$ with $C_2F_5C(O)O^-$ and $C_3F_5C(O)O^-$ at 298 K," 39(5):276-288.

Kerfoot (2000) "Ozone Supersparging for Chlorinated and Fluorinated HVOC Removal," In; Physical and Thermal Technologies: Remediation of Chlorinated and Recalcitrant Compounds, The 2$^{nd}$ International Conference on Remediation of Chlorinated and Recalcitrant Compounds, Eds: Wickramanayake, G.B.; Gavaskar, A.R., *Battelle Press*, Columbus, Ohio.

Kerfoot (2011) "The BISCO Concept: Biological-Compatible in-situ Chemical Oxidation with Coated Microbubble Ozone," In; North American Joint Regional Conference, International Ozone Association, Toronto, Ontario, Canada, 1 page.

Kerfoot et al. (2012) "Perfluorocompound Treatment by Peroxide-Coated Nanobubble AOP," In; The 28$^{th}$ Annual International Conference on Soils, Sediments, Water and Energy, AEHS Foundation, Amherst, Massachusetts.

Michaud et al. (2009) "Ozone Oxidation for Source Removal and a Prevention Barrier at a Fire Training Academy," In; The 25$^{th}$ Annual International Conference on Soils, Sediments, Water and Energy, University of Massachusetts, Amherst, Massachusetts.

Rayne, S. et al. (2009) "Congener Specific Organic Carbon Normalized Soil and Sediment-Water Partitioning Coefficients for the C1 through C8 Perfluoroalkyl Carboxylic and Sulfonic Acids," *Journal of Environmental Science and Health, Part A: Toxic/Hazardous Substances and Environmental Engineering.* 44(13):1374-1387.

Rayne, S. et al. (2009) Perfluoroalkyl sulfonic and carboxylic acids: A critical review of physicochemical properties, levels and patterns in waters and waste waters, and treatment methods. J. Environ Sci Health, Part A: Toxic/Hazardous Substances and Environmental Engineering 44 (12): 1145-1199.

Vecitis (2009) "Chapter 2: Treatment Technologies for Aqueous Perfluorooctanesulfonate (PFOS) and Perfluorooctanoate (PFOA)," *Chemical Reactions at Aqueous Interface*. Dissertation (Ph.D), California Institute of Technology.

Marley, M.G. et al. "The Application of a 3-D Model in the Design of Air Sparging Systems" Eastern Ground Water Issues Proceedings, 1992, pp. 377-392.

Marley, M.G. et al. The Application of In Situ Air Sparging as an Innovative Soils and Ground Water Remediation Technology, Spring 1992 GWMR, pp. 137-145.

\* cited by examiner

METHOD AND APPARATUS FOR TREATING PERFLUOROALKYL COMPOUNDS

CROSS REFERENCE TO RELATED APPLICATION

Not Applicable.

BACKGROUND

This invention is in the field of soil and groundwater treatment. This invention relates generally to processes and devices for reducing or eliminating perfluoroalkyl compound (PFC) concentrations in soil and groundwater.

Perfluoralkyl compounds such as PFOS (perfluoralkyl sulfonate) and PFOA (perfluoralkyl octanoic acid) are human-made substances, not naturally found in the environment, which do not hydrolyze, photolyze, or biodegrade in groundwater or soil. The compounds have been used as surface-active agents in a variety of products such as firefighting foams, coating additives and cleaning products. The toxicity and bioaccumulation potential of PFOS and PFOA, however, indicate a cause for concern. Studies have shown they have the potential to bioaccumulate and biomagnify up fish food chains. The products are readily absorbed after oral intake and accumulate primarily in the serum, kidney, and liver. Health-based advisories or screening levels for PFOS and PFOA have been developed by both the EPA and by an increasing number of States (Alaska, Maine, etc.) and European Countries (Finland, Sweden, Netherlands). Within the USA, Canada, and Europe (EU) there are an estimated 1000 sites with soil contamination (soils and groundwater) which have been used for fire foam training for aviation crashes.

Perfluoronated alkyl compounds are exceptionally stable because of the fully fluorinated bonding to the carbon atoms. They incorporate a long 8-carbon chain that is both lipid- and water-repellent. With a volatility at over 500° C., melting point at greater than 400° C., and boiling point that is not measurable, PFOS is used as surface-active agents in various high-temperature applications. The 3M Company, the primary manufacturer of PFOS, completed a voluntary phase-out of PFOS production in 2002 (ATSDR 2009; UNEP 2007).

Physical and chemical properties of PFOS and PFOA are provided in Table 1 (ATSDR 2009; Brooke et al. 2004; Cheng et al 2008; EFSA 2008; EPA 2002; UNEP 2006):

TABLE 1

| Property | PFOS (Potassium Salt) | PFOA |
|---|---|---|
| CAS Number | 2795-39-3 | 335-67-1 |
| Physical Description (physical state at room temperature and atmospheric pressure) | White Powder | White powder/waxy white solid |
| Molecular weight (g/mol) | 538 (potassium salt) | 414 |
| Water Solubility (mg/L at 25° C.) | 570 (purified), 370 (freshwater), 25 (filtered seawater) | $9.5 \times 10^3$ (purified) |
| Melting Point (° C.) | >400 | 45 to 50 |
| Boiling Point (° C.) | Not measurable | 188 |
| Vapor Pressure at 20° C. (mm Hg) | $2.48 \times 10^{-6}$ | 0.017 |
| Air water partition coefficient (Pa.m$^3$/mol) | $<2 \times 10^{-6}$ | Not available |
| Octanol-water partition coefficient (log $K_{ow}$) | Not measurable | Not measurable |
| Organic-carbon partition coefficient (log $K_{oc}$) | 2.57 | 2.06 |
| Henry's law constant (atm m$^3$/mol) | $3.05 \times 10^{-9}$ | Not measurable |
| Half-Life | Atmospheric: 114 days Water: >41 years (at 25° C.) Photolytic: >3.7 years | Atmospheric: 90 days Water: >92 years (at 25° C.) Photolytic: >349 days |

Additional properties and molecular structures are provided in Table 2:

TABLE 2

| Property | PFOS | PFOA |
|---|---|---|
| Molecular Formula | $C_8HF_{17}O_3S$ | $C_8HF_{15}O_2$ |
| Molecular Structure | (structure with SO$_3$H group) | (structure with COOH group) |
| Molar mass (g/mol) | 500.13 | 414.07 |
| Appearance | | Colorless liquid |
| Density | | 1.8 g/cm$^3$ |
| Melting Point (° C.) | | 40 to 50 |
| Boiling Point (° C.) | 133 at 6 Torr | 189 to 192 |
| Solubility in water | | Soluble, 9.5 g/L |
| Solubility in other solvents | | Polar organic solvents |
| Acidity (pK$_a$) | <<0 | 0 |

Preliminary human health studies strongly indicate that these two perfluorinated compounds (PFCs) can bioaccumulate and pose significant risks. Both are water soluble, nonvolatile and persistent in the environment, causing them to be difficult to treat with conventional technology. For soil, excavation to acceptable landfills or incineration at high temperatures poses a high cost for remediation. For groundwater, extraction and adsorption on granulated activated carbon, a pump and treat procedure, would involve potentially tens of years to treat because a number of the PFCs are tightly bound to the soils. Other treatment alternatives are relatively experimental, expensive, and require groundwater extraction and ex-situ treatment (Hawley, Pancras, and Burdick, 2012).

Common chemical oxidation procedures have operational advantages for treatment in place but lack the reactivity and the oxidation potential to cleave the strong carbon/fluoride bond. Generally, activated persulfate (2.7 V), Fenton's reagent (2.8 V) and Perozone® (2.8 V) rank among the top chemical oxidation procedures for groundwater and soil in-situ treatment (ISCO), but do not reach the 2.9 V or above to cleave the Carbon-Fluorine bonds cleanly without leaving fragments. Ideally the process should be also capable of treating petroleum compounds spilled that required the use of foams composed of PFCs to fight aviation fires of actual crashes or for fire training exercises, without leaving behind high residual cations (e.g., iron) or anions (e.g., sulfates) which degrade the groundwater.

A number of recent laboratory studies attest to the effectiveness of chemical oxidation to destroy PFOS and PFOA, but the conditions are difficult to duplicate effectively in the field or secondary products were formed. The use of acoustic and UV light activation of persulfate would not be practical in situ but may be used ex situ. Hori et. al. (2005) found that advanced oxidation processes employing activated persulfate by heat efficiently degraded PFOA to fluoride ions and carbon dioxide, but did form minor amounts of shorter-chain perfluorocarboxylic acids, indicating complete mineralization may be possible with further oxidation. An aqueous solution containing 155 mg/L PFOA and 12 g/L persulfate was heated at 80° C. After 6 hours, aqueous phase PFOA concentrations were less than 0.6 mg/L (the detection limit). Fluoride ions and carbon dioxide were measured (molar ratios of 77.5% and 70.2%, respectively) to show complete mineralization. High sulfate residuals were also noted.

Ahmad et. al. 2012 found that hydroxyl radical (OH.), which is usually effective in oxidizing saturated and unsaturated carbon bonds in organic pollutants, is ineffective in degrading PFOA (kOH-PFOA<$10^5$ L mol$^{-1}$ s$^{-1}$). Several chelated hydrogen peroxides (CHPs) were effective in degrading PFOA: when (III)-catalyzed $H_2O_2$ decomposition used 1 M $H_2O_2$ and 0.5 mM iron (III), PFOA was degraded by 94% within 150 minutes; in reactions generating $O_2^-$ or $HO_2^-$ alone, PFOA was degraded rapidly. Hydroperoxide anion, the conjugate base of $H_2O_2$ (pKa 11.7) was generated by increasing the pH of a 2 M $H_2O_2$ solution to 12.7.

SUMMARY

The present invention provides methods and systems for treating a site containing perfluoroalkyl compounds (PFCs). In embodiments, the method and systems treat the site with fine oxygen/ozone gas bubbles delivered with a hydroperoxide coating and solution which is activated by self-created temperature or applied temperature to raise the oxidation potential above 2.9 volts. Once begun, the reaction is often self-promulgating until the PFC is exhausted, if PFC concentrations are sufficiently elevated.

In an aspect, the present invention provides methods of treating a site. A specific method of this aspect comprises the steps of: forming a mixture comprising a plurality of bubbles having a diameter less than 10 µm and a solution comprising a hydroperoxide, wherein the bubbles contain gas phase ozone at a concentration greater than or equal to 1000 ppmV; providing the mixture to a site; and thermally activating the plurality of bubbles to a temperature greater than or equal to 40° C., wherein the thermally activated plurality of bubbles have an oxidation potential greater than or equal to 2.9 volts, thereby treating the site.

In embodiments, one or more of the plurality of bubbles comprises a plurality of ozone molecules positioned such that a negative charge is directed toward a surface of a bubble. Optionally, one or more of the plurality of bubbles comprises a plurality of ozone molecules oriented such that a positive charge is directed toward an interior of a bubble. Optionally, one or more of the plurality of bubbles have a negative surface charge, thereby providing a repulsive force between adjacent bubbles.

In embodiments, the plurality of bubbles forms an emulsion. Optionally, the plurality of bubbles forms a saturated emulsion. In embodiments, a number density of bubbles provided at the site is greater than or equal to $10^6$ per liter.

In an exemplary embodiment, the site comprises soil having one or more contaminants and the method comprises a method of cleaning up the one or more contaminants. Optionally, methods of this aspect comprise oxidizing at least a portion of the one or more contaminants, reducing at least a portion of the one or more contaminants or both oxidizing and reducing at least portions of the one or more contaminants.

Methods of this aspect are optionally useful for treating a site comprising one or more contaminants selected from the group consisting of a fluorocarbon, a perfluorinated compound, a perfluoroalkyl compound, perfluorooctane sulfonate (PFOS), perfluorooctanoic acid (PFOA), perfluorohexane sulfonate (PFHxS), perfluorohexanoic acid (PFHxA), perfluoropentanoic acid (PFPeA), perfluorobutane sulfonate (PFBS), perfluorodecanoic acid (PFDA), perfluorobutanoic acid (PFBA) perfluorodecanoic acid (PFDoA), perfluoroheptanoic acid (PFHpA), perfluorononanoic acid (PFNA), perfluoroctane sulfonamide (PFOSA), perfluoroundecanoic acid (PFUnA) and any combination of these.

Methods of this aspect are optionally useful for treating a site comprising one or more contaminants selected from the group consisting of a liquid hydrocarbon, a petroleum distillate, gasoline, diesel fuel, fuel oil, jet fuel, iso-octane, heptane, benzene, toluene, naphthalene, trimethylbenzene, ethanol, methanol, methyl tert-butyl ether, ethyl tert-butyl ether, dimethyl ether, kerosene, methylnaphthalene, freons, chlorinated alkyls, chlorinated and fluorinated alkyls and any combination of these. In embodiments, the methods of the present invention are used in tandem or in sequence with prior methods for treating these non-perfluorinated compounds.

In an exemplary embodiment, the hydroperoxide comprises hydrogen peroxide. Optionally, a concentration of the hydroperoxide is greater than or equal to 5%, greater than or equal to 8%, greater than or equal to 10%, greater than or equal to 15% or greater than or equal to 20%. In other embodiments, the hydroperoxide is selected from the group consisting of hydrogen peroxide, formic peracid, hydroxymethyl hydroperoxide, 1-hydroxylethyl peroxide, peroxyformic acid, isopropoxide any derivative thereof and any combination thereof.

Optionally, the hydroperoxide forms a coating on a plurality of the bubbles. In certain embodiments, reactions between the ozone and the hydroperoxide form one or more of $O_2^-$, $O_2^-\cdot$, $HO_2^-$, $OH$. and $HO_2$. at the site. Generation of one or more of $O_2^-$, $O_2^-\cdot$, $HO_2^-$, $OH$. and $HO_2$. at the site is useful, for example, for chemically breaking down one or more contaminants found at the site. In certain embodiments, the site comprises soil and/or groundwater having one or more contaminants.

Optionally, the plurality of bubbles have a diameter less than 5 µm, less than 1 µm, less than 500 nm, less than 100 nm or less than 50 nm. Optionally, the bubbles contain gas phase ozone at a concentration greater than or equal to 1200 ppmV, greater than or equal to 1400 ppmV, greater than or equal to 1600 ppmV, greater than or equal to 1800 ppmV, greater than or equal to 2000 ppmV, greater than or equal to 2200 ppmV or greater than or equal to 2400 ppmV.

Optionally, the step of providing the mixture to a site comprises delivering the mixture to the site through a diffuser. For example, the mixture is optionally delivered into soil and groundwater at the site. Optionally, the diffuser comprises a porous material having a pore size selected from the range of about 1 µm to about 50 nm. In certain embodiments, the mixture is delivered through the diffuser in a pulsed manner. In an exemplary embodiment, the step of providing the mixture to a site comprises maintaining a shear rate of about 50 cm per second or greater across a surface of the diffuser. In a specific embodiment, the step of forming the mixture comprises providing ozone gas to an inner surface of a diffuser at a pressure selected from the range of about 10 psi to about 40 psi. Optionally, the step of forming the mixture further comprises providing the solution comprising a hydroperoxide at an outer surface of the diffuser.

Methods of this aspect include thermally activating the plurality of bubbles. For example, the step of thermally activating the plurality of bubbles optionally comprises reacting at least a portion of the bubbles or hydroperoxide with one or more reagents or contaminants provided at the site. In embodiments, the step of thermally activating the plurality of bubbles comprises preheating at least a portion of the solution to a temperature greater than an ambient temperature at the site. Optionally, the step of thermally activating the plurality of bubbles self-occurs through an exothermic reaction. In an exemplary embodiment, the step of thermally activating occurs from heating soil saturated with the mixture at the site to 40° C. or greater. Optionally, the mixture is heated to 40° C. or greater or the site is heated to 40° C. or greater or the solution is heated to 40° C. or greater.

Methods of this aspect optionally include treatment of the site by providing a plurality of different mixtures to the site. Optionally, a plurality of different mixtures are provided to the site in sequence. Useful mixtures provided to the site include, but are not limited to, the mixtures described above comprising a plurality of bubbles having a diameter less than 10 µm, one or more solutions comprising a hydroperoxide and a mixture comprising Perozone® 2.0. Optionally, the mixtures are provided in the following sequence: a mixture described above comprising a plurality of bubbles having a diameter less than 10 µm, a mixture comprising Perozone® 2.0, and a mixture described above comprising a plurality of bubbles having a diameter less than 10 µm. Such an alternating mixture is useful, for example, when the site contains contaminants in addition to PFCs, for example, one or more hydrocarbons or one or more polycyclic aromatic hydrocarbons (PAHs). Optionally, the plurality of mixtures are sequenced to a plurality of inlets to provide a plurality of mixture streams to the site. In embodiments, a plurality of inlets is useful for treating a large area site. Optionally, the plurality of mixtures are provided to the site in a desired sequence to complete a treatment of the site.

In certain embodiments, the mixture further comprises iron. In certain embodiments, the solution comprising a hydroperoxide further comprises iron. In embodiments, solutions and mixtures comprising iron are useful because, under some circumstances, iron participates as a catalyst in one or more chemical reactions involved with decomposition of a contaminant present at the site.

In another aspect, the present invention provides a generator for treating a site. In an embodiment, a generator of this aspect comprises: a casing able to raise ow withstand a pressure above 1 bar beyond atmospheric pressure or above 15 psi; a bubble generator disposed in the casing, wherein the bubble generator receives a supply of a gas comprising ozone and a solution comprising a peroxide; and a stirrer disposed near an egress of the casing. Optionally, the casing comprises a pump or a pressure generator. Optionally, the casing is positioned in fluid communication with a pump or a pressure generator.

In an exemplary embodiment, the bubble generator comprises a porous diffuser having a pore size selected over the range of about 1 µm to about 50 nm. A diffuser of this nature is useful for generation of small bubbles, for example, bubbles having a diameter of 10 µm or less, 1 µm or less, 500 µm or less or 100 µm or less. Optionally, the bubble generator receives a hydroperoxide solution and ozone gas, thereby generating a mixture of bubbles comprising ozone gas having a diameter less than or equal to 10 µm in the hydroperoxide solution.

In embodiments, the stirrer comprises a paddle of magnetic material. Optionally, a magnetic stirrer is disposed against the paddle to cause the paddle to rotate and act as a stirrer. Optionally, the stirrer stirs the mixture until a saturated emulsion of bubbles comprising ozone gas forms in the hydroperoxide solution. In embodiments, the saturated emulsion is released in periodic pulses into contaminated soil and groundwater.

DETAILED DESCRIPTION

In general the terms and phrases used herein have their art-recognized meaning, which can be found by reference to standard texts, journal references and contexts known to those skilled in the art. The following definitions are provided to clarify their specific use in the context of the invention.

"Hydroperoxide" refers to an aqueous solution containing a pair of singly bonded oxygen atoms having −1 oxidation states or containing a peroxide anion ($O_2^{2-}$).

"Thermally activating" refers to providing sufficient thermal energy to a mixture of reactants such that they possess sufficient energy to react with one another. In embodiments, one reactant of a mixture is provided with sufficient thermal energy such that when the component is brought into contact with another reactant, reaction between the reactants takes place. In the absence of thermal activation, in embodiments, reaction between reactants does not occur, occurs at a rate insufficient for maintaining the reaction in a self-propagating manner, or occurs at a rate insufficient for elimination of one or more of the reactants over a specified time period (e.g., 1 hour, 1 day, 1 month, 1 year, etc.).

"Contaminant" refers to an unwanted or foreign substance present at a site. In embodiments, a contaminant refers to compositions present in groundwater or soil, such as a hydrocarbon or a perfluoroalkyl compound.

"Oxidizing" and "oxidation" refers to a process in which a compound undergoes a loss of electrons or an increase in oxidation state. An "oxidizing agent" is a compound which reacts with and to oxidize another compound.

"Reducing" and "reduction" refers to a process in which a compound undergoes a gain of electrons or an decrease in oxidation state. An "reducing agent" is a compound which reacts with and to reduce another compound.

"Perfluorinated compound" refers to a carbon containing compound in which no carbon atoms in the compound have carbon-hydrogen bonds and instead contain carbon-fluorine bonds.

"Diffuser" refers to a porous material which is used to generate bubbles in a solution by passing gas through the porous material and into the solution.

"Perozone®", "Perozone® 2.0" and "Perozone 2.0" are interchangeably used herein to refer to a mixture of ozone and oxygen bubbles in a peroxide solution where the bubbles generally have diameters less than 200 μm. In embodiments, the peroxide exists in a layer around the ozone bubbles, the mixture has an oxidation potential of about 2.8 V, and the bubbles typically have diameters in the 20 to 50 μm range.

In an embodiment, a composition or compound of the invention is isolated or purified. In an embodiment, an isolated or purified compound is at least partially isolated or purified as would be understood in the art. In an embodiment, the composition or compound of the invention has a chemical purity of 90%, optionally for some applications 95%, optionally for some applications 99%, optionally for some applications 99.9%, optionally for some applications 99.99%, and optionally for some applications 99.999% pure.

Figure 1:
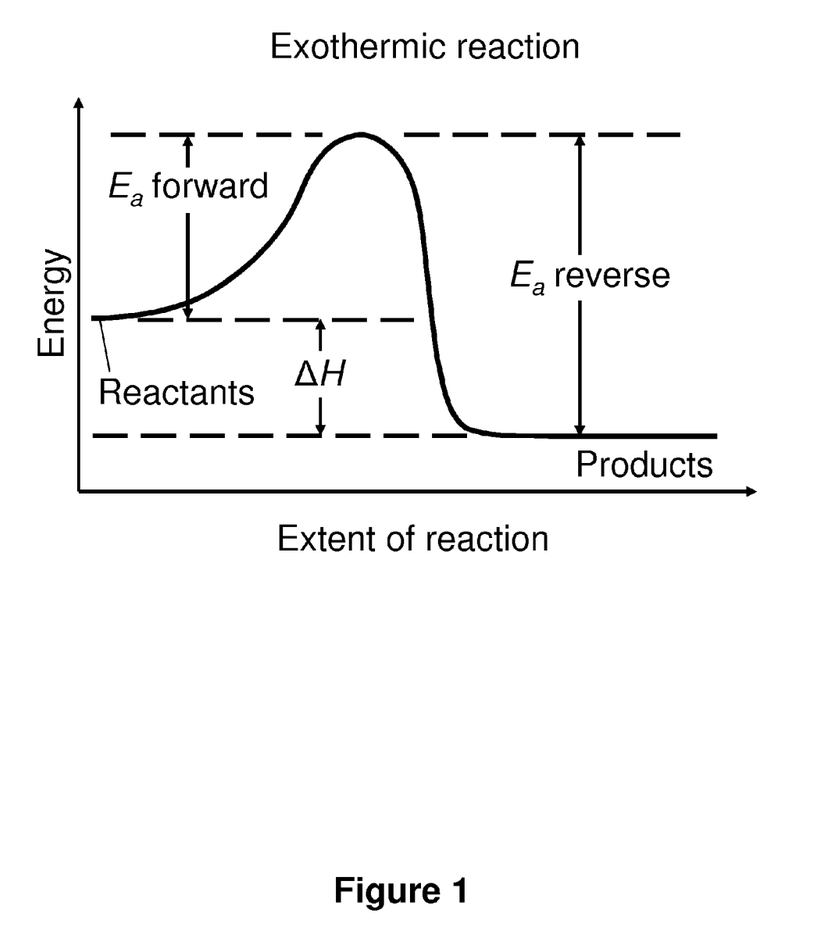
FIG. 1 provides a schematic diagram of a reaction energy profile.

FIG. 1 provides a schematic illustration of a reaction energy profile for an exothermic reaction, showing the energy released from the reaction (ΔH), the forward activation energy ($E_a$ forward) or energy needed to permit the reaction to proceed from reactants to products, and the reverse activation energy ($E_a$ reverse) or energy needed to permit the reaction to proceed from products to reactants. Although the oxidation of a PFC is generally exothermic, there is a considerable forward activation energy required to break C—F bonds in the compounds. In general, conventional oxidants are incapable of providing sufficient activation energy to begin degradation of PFCs.

The inventor of the present invention, however, has found that emulsified ozone with peroxide coating solution using nanobubble ozone reacts with PFCs including PFOS and PFOA to yield a moderately exothermic reaction to 43° C., resulting in over 97% removal in 120 minutes. Here the heat is provided by heat of reaction and most likely produces intermediary products of $O_2^-$ and $HO_2^-$, derived from the ozone reaction with peroxide, to react with the carbon-fluorine (C—F) bond. Since the oxidation potential of the nanobubble emulsion appears to be increased over that of the microbubble form (20-50 micron size), also referred to herein as Perozone 2.0 or Perozone® or Perozone®2.0, the reactant is referred to as "Perozone-3.0". The end products are fluoride ions, $CO_2$ and $H_2O$.

Perozone® has been used to degrade organic petroleum residuals found on fire training areas. These include the alkanes and naphthalenes which have been attached to soils with partitioning coefficients greater than 1:100 groundwater/soil. Michaud and Cambareri (2010) used Perozone® oxidation for Source Removal and a Prevention Barrier at the Barnstable Fire Training Academy. A significant advantage exists since the oxygen supplied in kg/day is derived from oxygen from air and degrades the petroleum hydrocarbons to $CO_2$ and $H_2O$ in a biological-compatible in-situ chemical oxidation (BISCO) process (Kerfoot, 2011) which progresses with the PFC degradation.

The reactive ozone form discussed here is not the traditionally dissolved molecular ozone, which has a far greater half-life and deals with film reactions. The kinetic reaction of the gaseous form involves a pressure term unlike the dissolved ozone kinetic. This provides the advantage that greater concentrations and/or partial pressures of gas-phase ozone can be used to drive the reaction towards completion. Accordingly, the present invention provides a benefit that gas phase reactions involving ozone can take place in significant quantity, thereby accessing chemistries nominally unavailable in prior systems.

Additionally, the present systems and methods achieve an unexpected benefit of providing for an oxidation potential greater than previously known oxidants, such as $O_2$ (1.2 V), $MnO_4$ (1.7 V), $H_2O_2$ (1.8 V), molecular $O_3$ (2.1 V), gaseous $O_3$ (2.4 V), activated persulfate (2.7 V), Fenton's reagent (2.8 V) and Perozone® (2.8 V), thereby permitting the rapid processing of PFCs. In embodiments, the present systems and methods achieve oxidation potentials greater than 2.9 V and, optionally, greater than 3.0 V. The present systems and methods achieve these high oxidation potentials through various chemical reactions involving $O_3$, $O_2$, $H_2O_2$, $HO_2^-$, $O_2^-$, $O_2^-$·, OH· and/or $HO_2$·. These benefits are unexpected because the prior oxidants, such as Perozone®, are incapable of significantly treating PFCs and, up until the present invention, no known chemical treatment methods have proved suitable for cleanup of PFC contaminated soil and groundwater.

Figure 2:
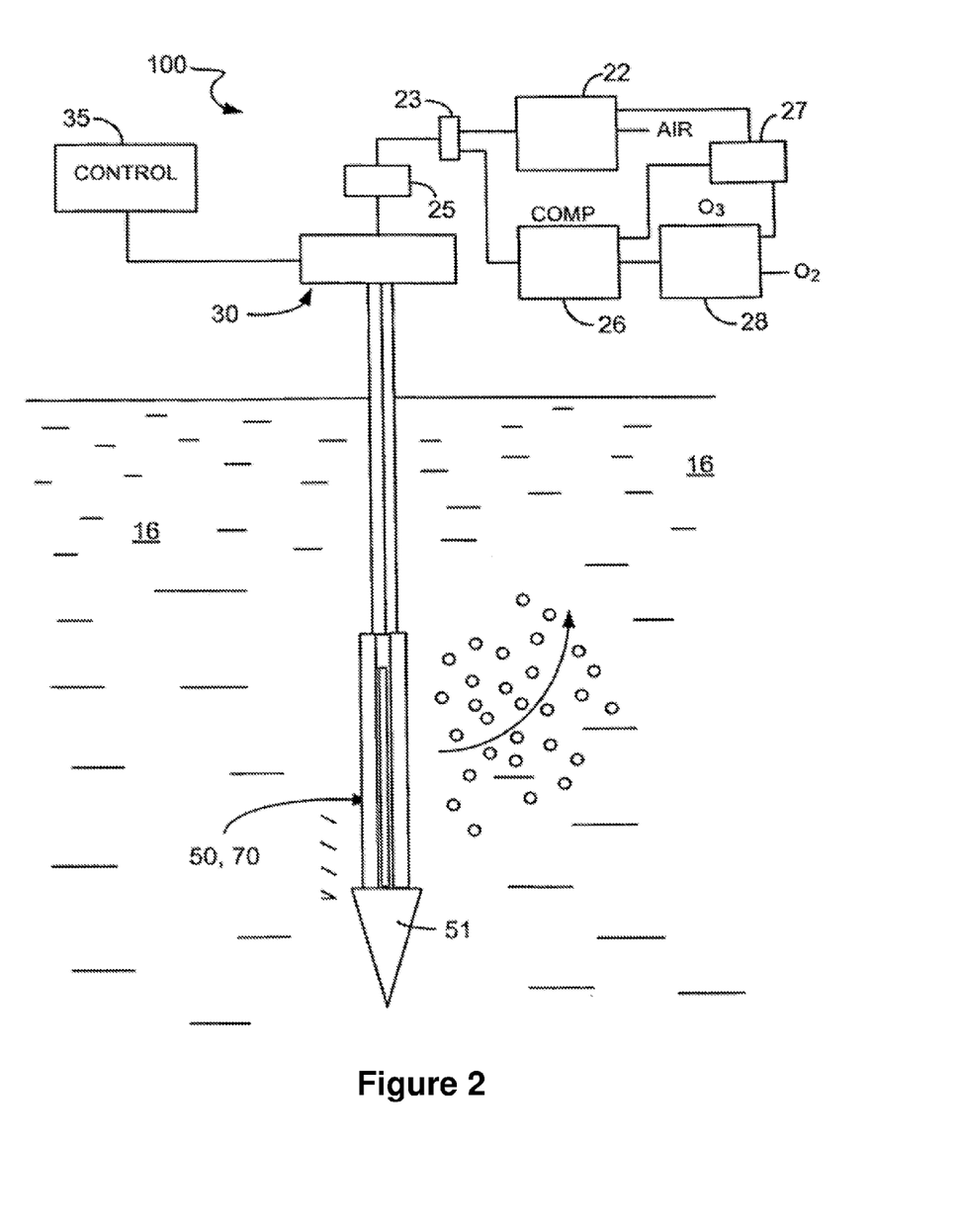
FIG. 2 provides a cross-section view of a sparging treatment example.

Referring now to FIG. 2, a sparging arrangement 100 for treating plumes, sources, deposits or occurrences of contaminants, is shown. The arrangement 100 includes one or more directional diffusers 50, 70 disposed directly through a surrounding ground/aquifer region 16. As shown in FIG. 2, the directional diffusers 50, 70 are of a type that has a pointed member 51 on an end thereof to allow the pointed member to be driven or injected into the ground without the need for a well or casing.

The arrangement 100 also includes a first air compressor/pump 22, the compressor/pump control mechanism 27, two port mixing valve 23, the second pump 26, ozone generator 28 and so forth. The mixing valve 23 is coupled via a check valve 25 to an inlet port of a solenoid-controlled valve 30 controller via the control arrangement 35.

In arrangement 100, the outlet ports of the solenoid-controlled valve 30 are controlled by solenoids that selectively open and close the outlet ports, permitting fluid to escape from one or more of the outlet ports. The outlet ports are coupled to feed lines generally that are coupled to inlet fittings on a cap of the directional diffuser 50, 70. The directional diffuser 50, 70 allows nanobubbles to be directed in selected directions into a surrounding soil formation 16.

In the embodiment described, a gas stream comprising ozone is delivered to the directional diffuser 50, 70 along with a hydroperoxide solution to generate an ozone nanobubble and hydroperoxide mixture or emulsion.

In the illustrated embodiment, the ozone nanobubbles and hydroperoxide mixture exits from walls of the directional diffuser 50, 70. The mixture affects substantial removal of above-mentioned or similar types of contaminants. The arrangement optionally includes a pump that supplies nutrients such as catalyst agents including iron containing compounds such as iron silicates or palladium containing compounds such as palladized carbon. In addition, other materials such as platinum may also be used.

The nanobubble/hydroperoxide mixture promotes rapid decomposition reactions with perfluorinated compounds in addition to volatile organics. The production of nanobubbles and selection of appropriate size distribution is provided by using microporous and nanoporous material and a bubble chamber for optimizing gaseous exchange through high surface area to volume ratio and long residence time within the liquid to be treated. The equipment promotes the continuous production of nanobubbles while minimizing coalescing or adhesion, thereby forming nanobubble emulsions.

The injected mixture moves as a fluid into the material to be treated. The use of ozone nanobubble emulsions enhances and promotes in-situ stripping of volatile organics and polyfluorinated compounds and simultaneously terminates the normal reversible Henry's Law reaction. The process involves promoting simultaneous volatile organic compounds (VOC) in-situ stripping and gaseous decomposition, with moisture (water) and substrate (catalyst or enhancer). The basic chemical reaction mechanism of air/ozone encapsulated in micron-sized bubbles is further described in several of my issued patents such as U.S. Pat. No. 7,651,611 "Directional microporous diffuser and directional sparging"; U.S. Pat. No. 6,596,161 "Laminated microporous diffuser"; U.S. Pat. No. 6,582,611 "Groundwater and subsurface remediation"; U.S. Pat. No. 6,436,285 "Laminated microporous diffuser"; U.S. Pat. No. 6,312,605 "Gas-gas-water treatment for groundwater and soil remediation"; and U.S. Pat. No. 5,855,775 "Microporous diffusion apparatus" all of which are incorporated herein by reference. Further chemical reaction mechanisms for the breakdown of perfluorinated compounds are described below.

Figure 3:
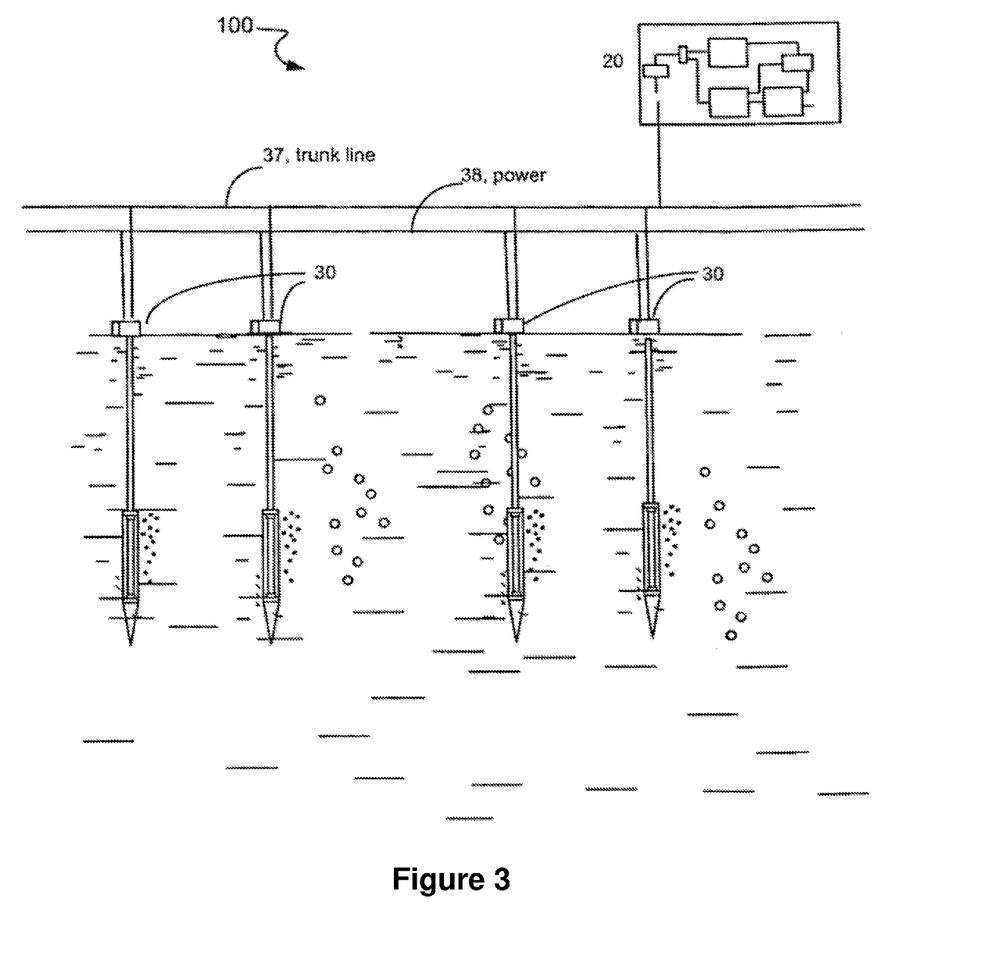
FIG. 3 provides a diagrammatical view of a multi-sparging apparatus installation.

Referring to FIG. 3, an illustrative installation of a multi-site treatment example of FIG. 2 is shown. In this example, multiple sparging apparatus (not numbered here (although others could be used), are disposed over a site. In this example, "NEMA 4" (explosion proof) boxes enclose solenoids and circuit boards 30 for remotely controlling the time and duration of the directional sparging. Such an arrangement can be used in gasoline spill areas, for example, where electrical circuits and solenoids are isolated from contact with explosive vapors. By having a separate circuit board in the well box, the well box can be placed anywhere along a pressurized main 37 for gas and liquid, as discussed below.

Electrical current is supplied via a line 38 to operate the solenoids and circuits 30. This simplifies installations that require a large number of well installations since individual gas and liquid tubing from a master control 20 are not necessary to operate the wellhead. Optionally, various treatment mixtures can be cycled through pressurized main 37, such as Perozone® 2.0 and Perozone-3.0 for simultaneous and/or sequential treatment and cleanup of hydrocarbon contaminants and perfluoroalkyl compound contaminants. Optionally, multiple individual systems such as illustrated in FIG. 3 can be implemented at a single site, where each system provides a separate treatment mixture to the site, such as Perozone® 2.0 and Perozone-3.0.

Without wishing to be bound by any particular theory, there can be discussion herein of beliefs or understandings of underlying principles relating to the invention. It is recognized that regardless of the ultimate correctness of any mechanistic explanation or hypothesis, an embodiment of the invention can nonetheless be operative and useful.

The invention may be further understood by the following non-limiting examples.

EXAMPLE 1

Bench Scale Testing—Canadian Site

On one foam fire-fighting site, samples of groundwater from monitoring well 1 (MW1) and soil samples between MW1 and monitoring well 3 (MW3) were shipped to the laboratory in coolers with blue ice packing to maintain the temperature at less than 4.4° C. (40° F.). Two sets of tests were conducted, groundwater and soil treatment.

Procedure.

Bench scale tests were conducted in a pressurized glass cylindrical reaction cell (17-20 psi) holding a laminar stainless steel spargepoint with a 0.20-micron porous surface. Four liters of groundwater were mixed together. A liter of distilled water as a blank was treated and set aside for analysis. The first liter of groundwater was also set aside as "start" condition (0 minutes). One liter of groundwater from MW1 was added to the cell. An ozone flow of 5 $cm^3$/sec was added at 1260 ppmV. Peroxide (10%) flow was 8 $cm^3$/minute and treated for 30 minutes. Pressure was 17-20 psi.

A second liter was added to the chamber and treated for 60 minutes. The blank, original (start), 30 minute, and 60 minute samples were placed in ice for analysis. A final sample (120 minute) was treated with 60 minutes of peroxide, but ozone continued for 120 minutes.

For soil samples, 1000 $cm^3$ of soil was mixed together and then separated into four 250 $cm^3$ aliquots. The first was submitted as background (start) condition. The remaining three were treated with a fine bubble-coated ozone bubble solution from the pressurized generator (20-25 psi). The ozone concentration was 2400 ppmV with a flow of 5 $cm^3$/sec. The peroxide was 10% solution and supplied at 5 $cm^3$/min flow. The generator was filled with 500 liters of groundwater from the site well (MW1) which was delivered in 50 $cm^3$ surges to a two-liter flask with the soil under constant stirring action. The subsequent reaction raised the temperature of the soil/liquid solution from 20.6° C. (69° F.) to 22.8° C. (73° F.) after 10 minutes, reaching 41.1° C. (106° F.) after 30 minutes. For the 30-minute treatment, no further bubble solution was added; the flask was placed over water until bubbling ceased or two hours and then placed in chilled water. The overlying groundwater was decanted off, and the underlying semi-solid was placed in a glass jar and chilled for transport for analysis. A similar procedure was followed for the 60- and 120-minute soil aliquots.

Results.

Figure 4:
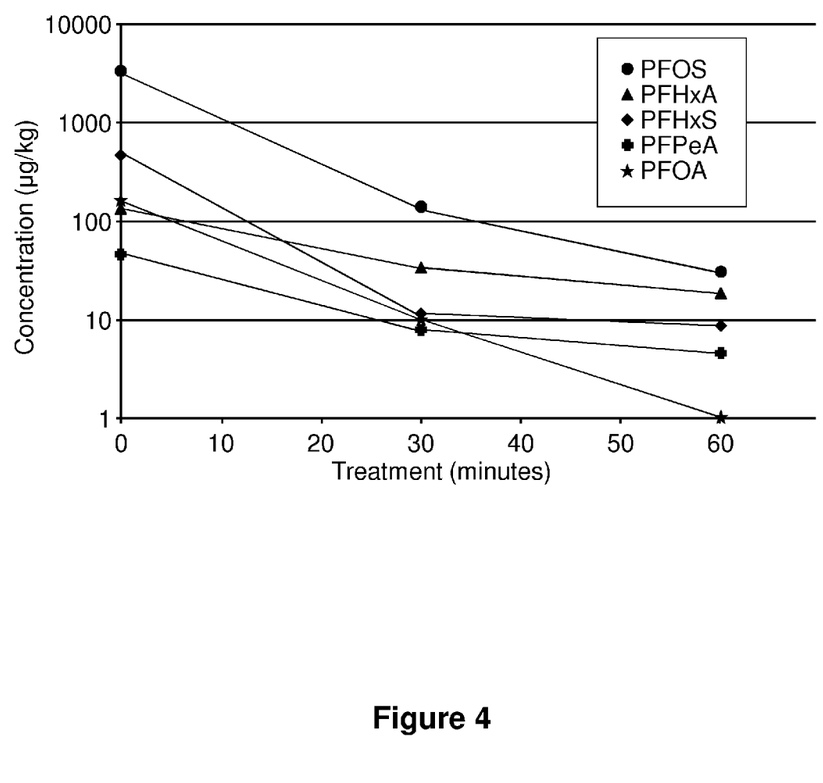
FIG. 4 provides data showing the degradation of various perfluorinated compounds as a function of treatment time.

The results of treatment are presented in Tables 3 and 4. FIG. 4 graphs the rate of decay of soil concentrations with time to 60 minutes for the primary perfluoro compounds. The higher ozone concentration (2400 ppmV compared to 1260 ppmV) and increased temperature of 41.1° C. (106° F.) to 43.3° C. (110° F.) caused removal to over 99% with PFOS and over 97% with PFOA in the soil series. No intermediates showed increases in concentration among the primary PF compounds. Each appeared to be degraded similarly.

The removal from groundwater over the soil fractions showed the similar increase in efficiency. PFOS showed a removal of 89.8% compared to 82.3% at a lower ozone concentration (2400 ppmV versus 1260 ppmV) and lower temperature exposure (69° F. versus 110° F.).

The new solution also appeared to be very effective in decomposing the other PF compounds, including PFHxS (98.1%), PFHxA (86.2%), and PFPeA (89.8%).

Discussion.

From both sets of analyses, fluorinated compounds were removed from both the aqueous and soil fractions. Within the reactor there appeared to be some minor etching of the glass, which would indicate the presence of hydrofluoric acid which attacks silica. The total mass evolved of HF would not be a high fraction, because the total mass of fluorinated ethenes is low compared to the aqueous mass.

When the peroxide-coated nanobubble mixture was introduced in contact with the 250 gram soil fraction, three events occurred: 1) A moderate exothermic reaction with considerable gas release, 2) A partial denaturing of the soil structure where sand fractions were diminished and adsorbed water created, and 3) The release of free iron which accumulated on the magnetic stirrer.

Degradation of PFOS.

From the immediate observations of the reactions of degradation of the PFOS, it was hypothesized that a set of 3 reactions are occurring.

Firstly, ozone reacts with peroxide to yield superoxide ($O_2\cdot$) and hydroperoxide ($HO_2\cdot$) radicals. In reactions generating either $O_2\cdot$ or $HO_2\cdot$, PFOA is degraded rapidly by nucleophilic attack.

Hydroperoxide anion, the conjugate base of $H_2O_2$, is known to react with $O_3$ to form hydroxyl radicals and superoxide radicals.

$$H_2O_2 + H_2O \leftrightarrow HO_2^- + H_3O^+$$

$$O_3 + HO_2^- \rightarrow OH\cdot + O_2^-\cdot + O_2$$

Secondly, the stoichiometry of the reaction results in the release of abundant fluoride ions, oxygen, carbon dioxide, and likely two moles of sulfate.

$$2\ C_8F_{17}SO_3H + 27\ H_2O_2 + 9\ O_3 \rightarrow 16\ CO_2 + 27\ H_2O_2 + 2\ SO_3^{-2} + 34\ F^- + 27\ O_2$$

Thirdly, the hydrofluoric acid reacts with iron silica aggregates in the soil to release iron and form fluorosilicates which likely volatilize from the heated mixture. Any free fluorine atoms are likely to react with free carbon. If low molecular weight CFs, they may also volatilize off.

$$4\ HF + SiO_2(s) + Fe^{-2} \rightarrow Fe(s)\downarrow + SiF_4(g)\uparrow + 2H_2O$$

TABLE 3

Removal of PF Compounds from Groundwater (GS1) with Nanozox™ Treatment (1260 ppmV O3, 10% $H_2O_2$).

| PFC | START | 1 HR | 2 HR | 3 HR | % REMOVAL |
| --- | --- | --- | --- | --- | --- |
| PFOS | 430 | 150 | 160 | 76 | 82.3 |
| PFOA | 34 | 17 | 13 | 9 | 73.6 |
| PFHxS | 300 | 100 | 110 | 42 | 86 |
| PFHxA | 270 | 110 | 150 | 86 | 69.2 |
| PFPeA | 84 | 27 | 23 | 15 | 82.1 |

TABLE 4

Removal of PF Compounds in Groundwater Over Soil Slurry

| PFC | START | 30 MIN | 60 MIN | 120 MIN | % REMOVAL |
| --- | --- | --- | --- | --- | --- |
| PFOS | 430 | 340 | 33 | 44 | 89.8 |
| PFOA | 34 | 22 | 4 | 3 | 91.2 |
| PFHxS | 300 | 87 | 14 | 8 | 97.4 |
| PFHxA | 270 | 75 | 34 | 23 | 91.5 |
| PFPeA | 84 | 13 | 8 | 6 | 92.9 |

Figure 5:
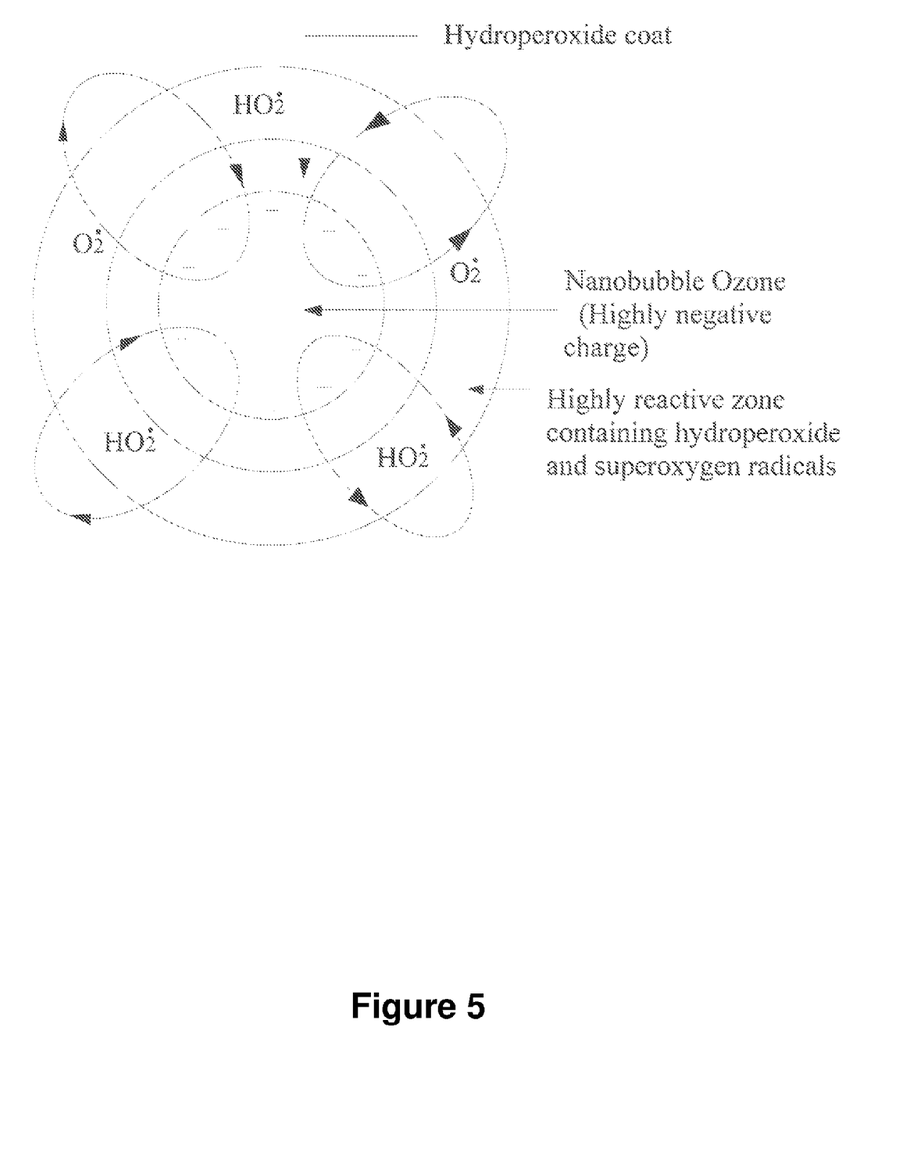
FIG. 5 provides a schematic diagram of an ozone nanobubble.
Figure 6:
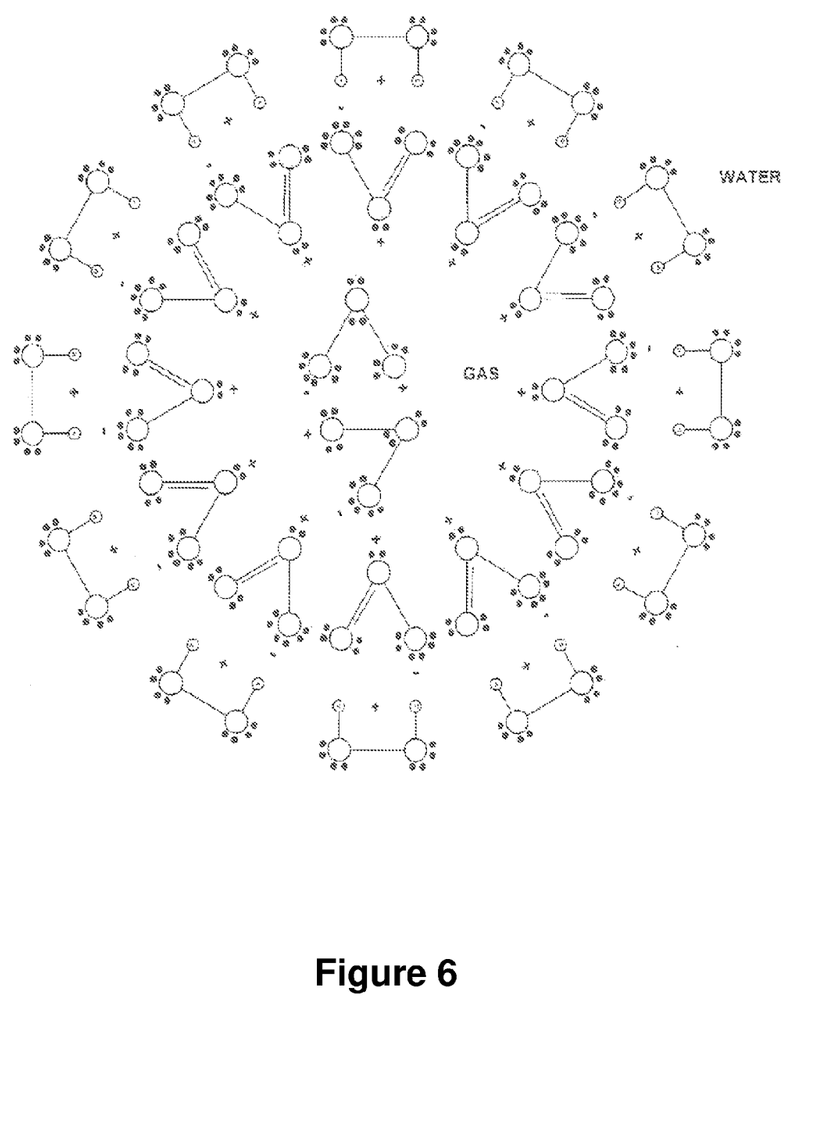
FIG. 6 provides a schematic diagram of the molecular structure of an ozone nanobubble.

In the mixture of the present invention, ozone is ideally retained in the form of nanobubbles (<1 micron size) as shown in the particle size depiction of FIGS. 5 and 6. The ozone nanobubbles are formed by supplying a high concentration of ozone (greater than one percent) and oxygen (both combined to greater than 90% gas) to the interior of the film to create a high negative charge which is then coated with a hydroperoxide (slightly positive charge). The extremely fine bubbles create an emulsion (greater than 10 million bubbles per liter) appearing milky white by reflected light. Under reaction, with temperature rise beyond 40° C., the normal hydroxyl-radical dominated outer zone of the bubble film is changed in nature to hydroperoxide and superoxygen radicals, raising the oxidation potential from 2.8 to beyond 2.9 volts, capable of directly cleaving the carbon-fluoride bond, which has a bond strength of 3.6 volts (Vecitis, 2009).

Mechanisms for Free Radical Reactions.

A reaction mechanism for the Perozone-3.0 radical mediated degradation of perfluoroalkyl carboxylates could follow the pathway similar to persulfate radical proposed by Kutsuna and Hori (Kutsuna, S., Hori, H., Int. J. Chem. Kin., 2007, p. 276). The initial degradation is postulated to occur through an electron transfer from the carboxy late terminal group to the hydroperoxide radical (Equation 1.0). The superoxygen provides additional reduction. The oxidized PFOA subsequently decarboxylates to form a perfluoroheptyl radical (Equation 1.1) which reacts quantitatively with molecular oxygen to form a perfluoroheptylperoxy radical (Equation 1.2). The perfluoroheptylperoxy radical will react with another perfluoroheptylperoxy radical in solution, since there are limited reductants present to yield two perfluoroalkoxy radicals and molecular oxygen (Equation 1.3). The perfluoroheptyloxy has a main pathway (Equation 1.4)—unimolecular decomposition to yield the perfluorohexyl radical and carbonyl fluoride. The perfluorohexyl radical formed with react with $O_2$ and resume the radical "unzipping" cycle. The $COF_2$ will hydrolyze to yield $CO_2$ and two HF (Equation 1.5). The perfluoroheptanol will unimolecularily decompose to give the perfluoroheptylacyl fluoride and HF.

$$CF_3(CF_2)_6COO^- + HO_2\cdot + O_2^-\cdot \rightarrow CF_3(CF_2)_6COO\cdot + HO_2^- + O_2 \quad (1.0)$$

$$CF_3(CF_2)_6COO\cdot \rightarrow CF_3(CF_2)_5CF_2\cdot + CO_2 \quad (1.1)$$

$$CF_3(CF_2)_5CF_2 \cdot + O_2 \rightarrow CF_3(CF_2)_5CF_2OO \cdot \quad (1.2)$$

$$CF_3(CF_2)_5CF_2OO \cdot + RFOO \cdot \rightarrow CF_3(CF_2)_5CF_2O \cdot + RFO \cdot + O_2 \quad (1.3)$$

$$CF_3(CF_2)_5CF_2O \cdot \rightarrow CF_3(CF_2)_4CF_2 \cdot + COF_2 \quad (1.4)$$

$$COF_2 + H_2O \rightarrow CO_2 + 2HF \quad (1.5)$$

Related Compounds on Fire Training Areas.

The PFC treatment system should be able to be readily utilized for cleanup of fuel oil, aviation fuel, and gasoline spills at fire training locations. Perozone® has been used previously for removal of naphthalenes, BTEX (benzene, toluene, ethylbenzene, and xylenes), methylbenzenes, and residual long-chain alkanes (Michaud, S. and T. Cambareri, 2008, 2010). For instance, at the Barnstable Fire Training Academy, a Perozone® system was installed as a source treatment and barrier system to achieve naphthalene/methylnaphthalene levels below groundwater-one limits because of downgradient water supply wells on Cape Cod, a sole source drinking water supply region. Nine Laminar Spargepoints® were installed at the site. The Perozone® system uses ozone microbubbles with peroxide coatings which are pulsed out through the saturated soil (groundwater) regions to make contact with adsorbed and dissolved petroleum residual compounds. The compounds are converted to $CO_2$ and water, leaving no residual compounds of concern to drinking water well withdrawal.

Figure 7:
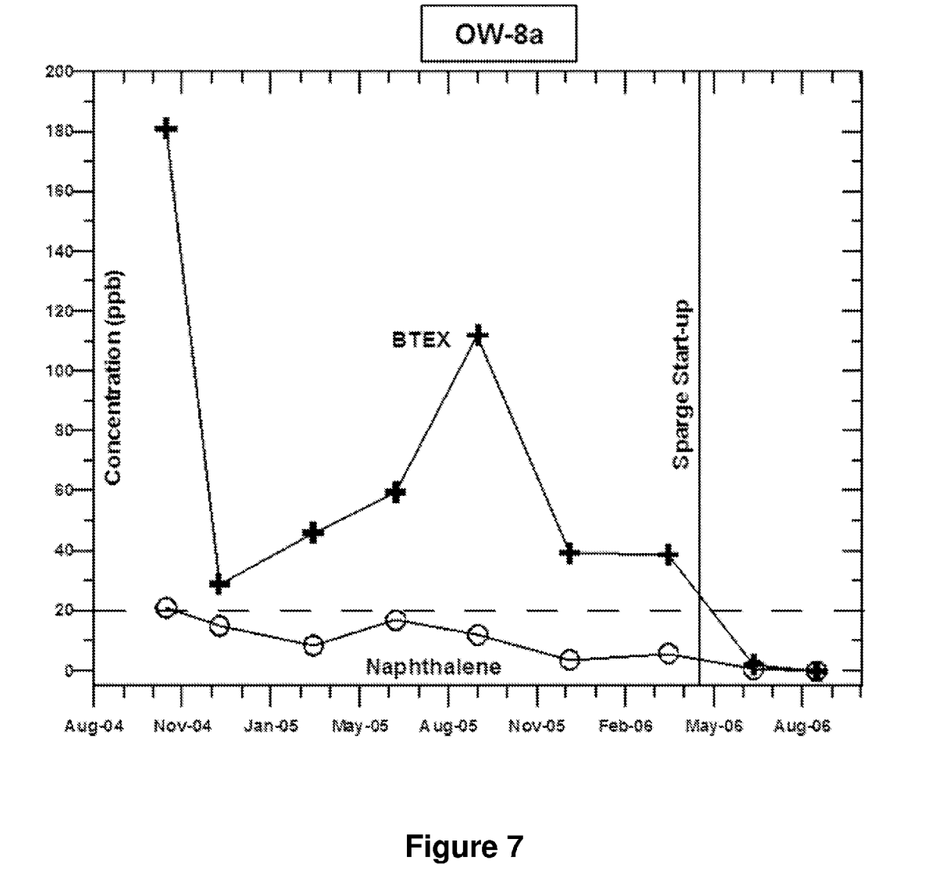
FIG. 7 provides data showing the degradation of BTEX and naphthalene by Perozone® as a function of time.
Figure 8:
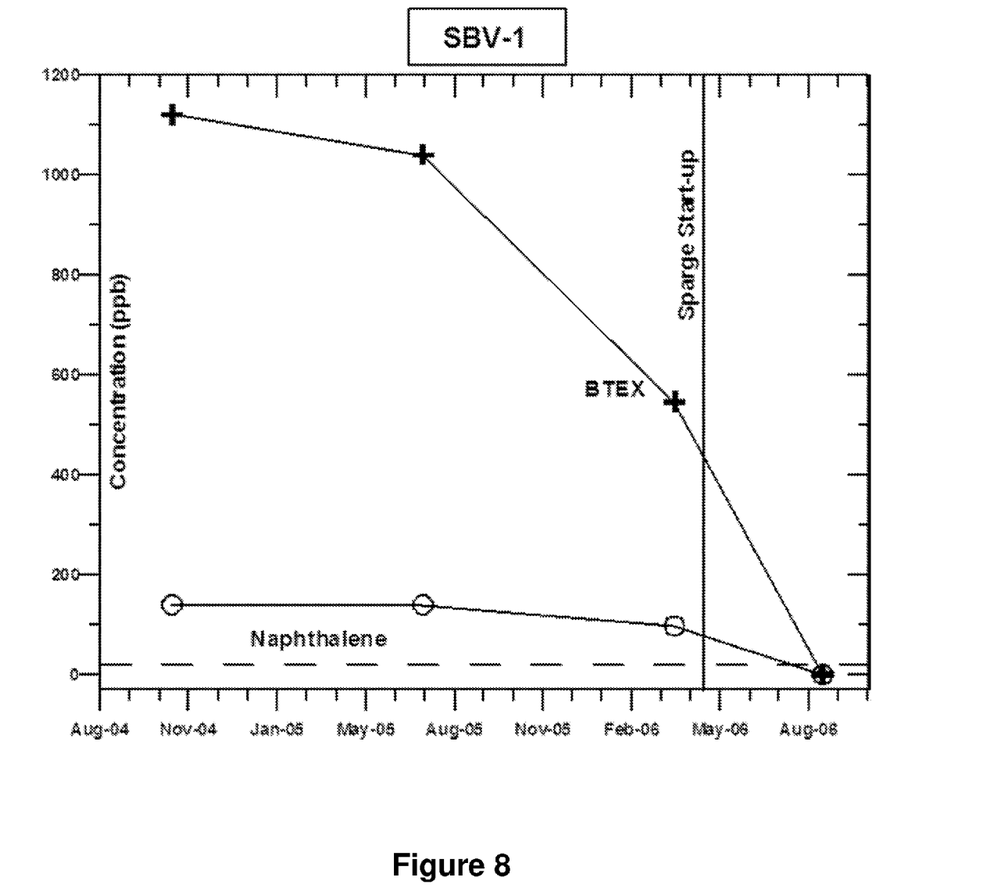
FIG. 8 provides data showing the degradation of BTEX and naphthalene by Perozone® as a function of time.

FIGS. 7 and 8 show data indicating the removal of BTEX and naphthalene compounds as the Perozone® treatment system was initiated as of August, 2006. Although the residual compounds of PFOS treatment are more complex than BTEX and naphthalene compound oxidation, the previous success at fire training sites and petroleum release sites demonstrates the compatibility to treat the petroleum residual compounds likely to be present along with the PFC compounds.

REFERENCES

Ahmad, M., A. L. Teel and R. J. Watts, 2010. Persulfate activation by subsurface minerals. Journal of Contaminant Hydrology 115: 34-45.

Ahmad, M., S. M. Mitchell, A. L. Teel, and R. J. Watts, 2012. Degradation of perfluorooctanoic acid (PFOA) by reactive species generated through catalyzed hydrogen peroxide propagation reactions. In Situ Chemical Oxidation: Recent Advances, Battelle Conference, Columbus, Ohio EPA, 2012. Emerging contaminants, perfluorooctane sulfonate (PFOS) and perfluorooctanoic acid (PFOA). Solid Waste and Emergency Response (5106P), EPA 505-F-11-002.

Hawley, E. L., T. Pancras, and J. Burdick, 2012. Remediation technologies for perfluorinated compounds (PFCs), including perfluorooctane sulfonate (PFOS) and perfluorooctanoic acid (PFOA). Arcadis White paper.

Katsuna, S., Horr, M. 2007. Int. J. Chem. Kin., p 276.

Kerfoot, W. B., 2000. Ozone supersparging for chlorinated and fluorinated HVOC removal. Remediation of Chlorinated and Recalcitrant Compounds, Monterey, Calif., Battelle Press, pp. 27-35.

Kerfoot, W. B., 2011. The BISCO concept: biological-compatible in-situ chemical oxidation with coated microbubble ozone. International Ozone Association, North American Joint Regional Conference, Toronto, Ontario, Canada.

Kerfoot, W. B. and D. Strajin, 2012. Perfluorocompound treatment by peroxide-coated nanobubble AOP. The 28th Annual International Conference on Soils, Sediments, Water and Energy, AEHS Foundation, Amherst, Mass.

Michaud, S. and T. Cambareri, 2009. Ozone oxidation for source removal and a prevention barrier at a fire training academy. The 25th Annual International Conference on Soils, Sediments, Water and Energy, University of Massachusetts, Amherst, Mass. (Perozone®, ozone use).

Rayne, S., K. Forest, 2009. Congener specific organic carbon normalized soil and sediment-water partitioning coefficients for the C1 through C8 perfluoroalkyl carboxylic and sulfonic acids. Journal of Environmental Science and Health, Part A: Toxic/Hazardous Substances and Environmental Engineering 44 (13): 1374-1387. Doi: 10.1080/10934520903217229 (http://dx.doi.org/10.1080%2F10934520903217229).

Rayne, S., K. Forest, 2009. Perfluoroalkyl sulfonic and carboxylic acids: A critical review of physicochemical properties, levels and patterns in waters and waste waters, and treatment methods. Journal of Environmental Science and Health, Part A: Toxic/Hazardous Substances and Environmental Engineering 44 (12): 1145-1199. Doi: 10.1080/10934520903139811 (http://dx.doi.org/10.1080%2F10934520903139811).

Wikipedia, 2012. Perfluorooctane sulfonic acid, 8 pp.

STATEMENTS REGARDING INCORPORATION BY REFERENCE AND VARIATIONS

All references throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

All patents and publications mentioned in the specification are indicative of the levels of skill of those skilled in the art to which the invention pertains. References cited herein are incorporated by reference herein in their entirety to indicate the state of the art, in some cases as of their filing date, and it is intended that this information can be employed herein, if needed, to exclude (for example, to disclaim) specific embodiments that are in the prior art. For example, when a compound is claimed, it should be understood that compounds known in the prior art, including certain compounds disclosed in the references disclosed herein (particularly in referenced patent documents), are not intended to be included in the claim.

When a group of substituents is disclosed herein, it is understood that all individual members of those groups and all subgroups and classes that can be formed using the substituents are disclosed separately. When a Markush group or other grouping is used herein, all individual members of the group and all combinations and subcombinations possible of the group are intended to be individually included in the disclosure. As used herein, "and/or" means that one, all, or any combination of items in a list separated by "and/or" are included in the list; for example "1, 2 and/or 3" is equivalent to "'1' or '2' or '3' or '1 and 2' or '1 and 3' or '2 and 3' or '1, 2 and 3'".

Every formulation or combination of components described or exemplified can be used to practice the invention, unless otherwise stated. Specific names of materials are intended to be exemplary, as it is known that one of ordinary skill in the art can name the same material differently. One of ordinary skill in the art will appreciate that methods, device elements, starting materials, and synthetic methods other than those specifically exemplified can be employed in the practice of the invention without resort to undue experimentation. All art-known functional equivalents, of any such methods, device elements, starting materials, and synthetic methods are intended to be included in this invention. Whenever a range is given in the specification, for example, a temperature range, a time range, or a composition range, all intermediate ranges and subranges, as well as all individual values included in the ranges given are intended to be included in the disclosure.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. Any recitation herein of the term "comprising", particularly in a description of components of a composition or in a description of elements of a device, is understood to encompass those compositions and methods consisting essentially of and consisting of the recited components or elements. The invention illustratively described herein suitably may be practiced in the absence of any element or elements, limitation or limitations which is not specifically disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

I claim:

1. A method of degrading perfluoroalkyl compounds in a site, the method comprising the steps of:
    forming a mixture comprising a plurality of bubbles having a diameter less than 10 μm, wherein the bubbles have an oxidation potential greater than or equal to 2.9 volts and less than or equal to 3.6 volts and a solution comprising a hydroperoxide, wherein the bubbles contain gas phase ozone at a concentration greater than or equal to 1000 ppmV; and
    providing the mixture to the site,
    thereby degrading perfluoroalkyl compounds in the site, wherein the site is a groundwater or soil treatment site.

2. The method of claim 1, wherein each of the plurality of bubbles comprises a plurality of ozone molecules positioned such that a negative charge is directed toward a surface of a bubble.

3. The method of claim 1, wherein each of the plurality of bubbles comprises a plurality of ozone molecules oriented such that a positive charge is directed toward an interior of a bubble.

4. The method of claim 1, wherein each of the plurality of bubbles have a negative surface charge, thereby providing a repulsive force between adjacent bubbles.

5. The method of claim 1, wherein the plurality of bubbles form an emulsion.

6. The method of claim 1, wherein a number density of bubbles provided at the site is greater than or equal to $10^6$ per liter.

7. The method of claim 1, wherein the site comprises soil having one or more contaminants and the method comprises a method of cleaning up the one or more contaminants.

8. The method of claim 1, wherein the method comprises oxidizing at least a portion of the one or more contaminants, reducing at least a portion of the one or more contaminants or both oxidizing and reducing at least portions of the one or more contaminants.

9. The method of claim 1, wherein the site comprises one or more contaminants selected from the group consisting of perfluorooctane sulfonate (PFOS), perfluorooctanoic acid (PFOA), perfluorohexane sulfonate (PFHxS), perfluorohexanoic acid (PFHxA), perfluoropentanoic acid (PFPeA), perfluorobutane sulfonate (PFBS), perfluorodecanoic acid (PFDA), perfluorobutanoic acid (PFBA) perfluorodecanoic acid (PFDoA), perfluoroheptanoic acid (PFHpA), perfluorononanoic acid (PFNA), perfluoroctane sulfonamide (PFOSA), perfluoroundecanoic acid (PFUnA) and any combination of these.

10. The method of claim 1, wherein the site comprises one or more contaminants selected from the group consisting of a liquid hydrocarbon, a petroleum distillate, gasoline, diesel fuel, fuel oil, jet fuel, iso-octane, heptane, benzene, toluene, naphthalene, trimethylbenzene, ethanol, methanol, methyl tert-butyl ether, ethyl tert-butyl ether, dimethyl ether, kerosene, methylnaphthalene, freons, chlorinated alkyls, chlorinated and fluorinated alkyls and any combination of these.

11. The method of claim 1, wherein the hydroperoxide comprises hydrogen peroxide.

12. The method of claim 1, wherein a concentration of the hydroperoxide is greater than or equal to 5%.

13. The method of claim 1, wherein the hydroperoxide is selected from the group consisting of hydrogen peroxide, formic peracid, hydroxymethyl hydroperoxide, 1-hydroxylethyl peroxide, peroxyformic acid, isopropoxide any derivative thereof and any combination thereof.

14. The method of claim 1, wherein the hydroperoxide forms a coating on a plurality of the bubbles.

15. The method of claim 1, wherein reactions between ozone and hydroperoxide form one or more of $O_2^-$, $O_2^-$·, $HO_2^-$, OH· and $HO_2$· at the site.

16. The method of claim 1 wherein the plurality of bubbles each have a diameter of 1 μm or less.

17. The method of claim 1, wherein the step of providing the mixture to a site comprises delivering the mixture to the site through a diffuser.

18. The method of claim 17, wherein the mixture is delivered through the diffuser in a pulsed manner.

19. The method of claim 17, wherein the mixture is delivered into soil and groundwater at the site.

20. The method of claim 17, wherein the diffuser comprises a porous material having a pore size selected from the range of about 1 μm to about 50 nm.

21. The method of claim 17, wherein the step of providing the mixture to a site comprises maintaining a shear rate of about 50 cm per second or greater across a surface of the diffuser.

22. The method of claim 1, wherein the step of forming the mixture comprises providing ozone gas to an inner surface of a diffuser at a pressure selected from the range of about 10 psi to about 30 psi.

23. The method of claim 22, wherein the step of forming the mixture further comprises providing the solution comprising a hydroperoxide at an outer surface of the diffuser.

24. The method of claim 1, wherein the method further comprises preheating at least a portion of the solution to a temperature greater than an ambient temperature at the site.

25. The method of claim 1, wherein the mixture is heated to 40° C. or greater.

26. The method of claim 1, wherein the site is heated to 40° C. or greater.

27. The method of claim 1, wherein a plurality of different mixtures are provided to the site in sequence.

28. The method of claim 27, wherein the plurality of mixtures comprises said mixture comprising a plurality of bubbles having a diameter less than 10 μm and one or more of a solution comprising a hydroperoxide and mixture of ozone and oxygen bubbles in a peroxide solution wherein said ozone and oxygen bubbles have a diameter of 20-50 microns.

29. The method of claim 27, wherein the plurality of mixtures are sequenced to a plurality of inlets to provide a plurality of mixture streams to the site.

30. The method of claim 27, wherein the plurality of mixtures are provided to the site in a desired sequence to complete a treatment of the site.

31. The method of claim 1, wherein the mixture further comprises iron or wherein the solution further comprises iron.

32. The method of claim 1, wherein a concentration of the hydroperoxide is greater than or equal to 8%.

33. The method of claim 1, wherein a concentration of the hydroperoxide greater than or equal to 10%.

34. The method of claim 1, wherein a concentration of the hydroperoxide greater than or equal to 15%.

35. The method of claim 1, wherein a concentration of the hydroperoxide greater than or equal to 20%.

36. The method of claim 1 wherein the plurality of bubbles wherein the plurality of bubbles each have a diameter of 500 nm or less.

* * * * *